Patented May 12, 1925.

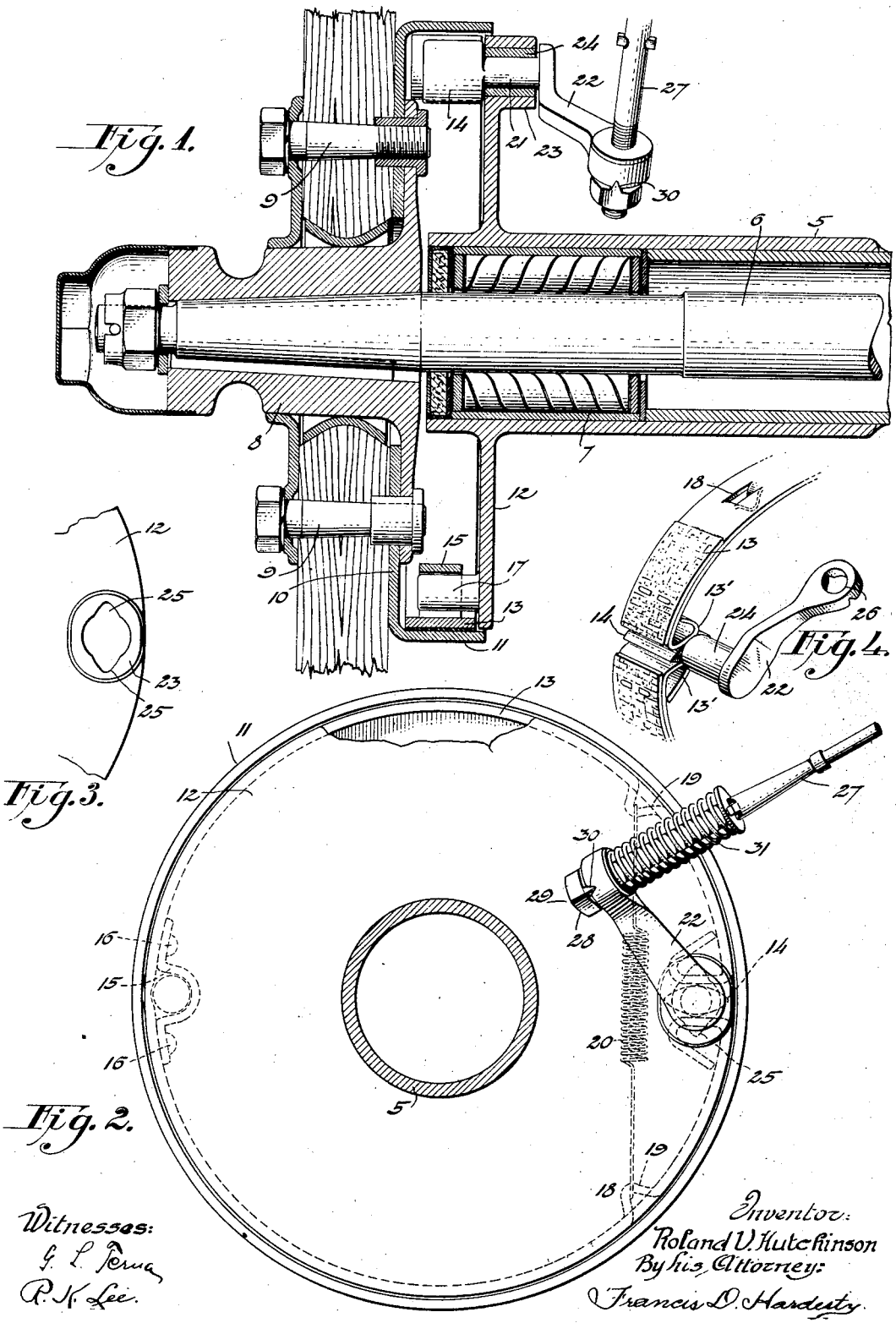

1,537,611

UNITED STATES PATENT OFFICE.

ROLAND V. HUTCHINSON, OF DAYTON, OHIO, ASSIGNOR TO GENERAL MOTORS RESEARCH CORPORATION, OF DAYTON, OHIO, A CORPORATION OF DELAWARE.

BRAKE.

Application filed May 23, 1921. Serial No. 471,614.

*To all whom it may concern:*

Be it known that I, ROLAND V. HUTCHINSON, a subject of the King of Great Britain, residing at Dayton, county of Montgomery, and State of Ohio, have invented certain new and useful Improvements in Brakes, of which the following is a full, clear, and exact description.

The invention relates to brakes and is more particularly concerned with a brake mechanism especially designed for use in connection with the rear wheel of a motor vehicle.

The primary object of the invention is to provide a brake mechanism of simple construction, inexpensive to manufacture and easy to assemble.

A further object is to provide a brake mechanism comprising a one-piece cam and brake lever together with means whereby the cam may be placed in operative position relative to the brake band.

A further object is to improve the construction of brake mechanism as hereinafter described in detail and set forth in the appended claims.

In the accompanying drawings illustrating one embodiment of the invention,

Fig. 1 is a sectional view showing parts of a vehicle wheel, axle, and brake;

Fig. 2 is a side elevation showing the brake mechanism of Fig. 1;

Fig. 3 is an elevation of a portion of the brake flange; and

Fig. 4 is a perspective view of a portion of the brake band and the operating mechanism.

Referring to the drawings, 5 indicates an axle housing within which a live axle 6 is supported on bearings 7, a wheel hub 8 being secured to the outer end of the axle. These parts may be of any usual or suitable construction, the invention being applicable to wheels and axles of various types and being useful also in some respects in other relations.

To the wheel is secured, as by bolts 9, a brake drum 10 having a flange 11 the inner surface of which provides a brake surface. A fixed member, shown as a brake flange 12, preferably formed integrally with the axle housing 5, closes the inner side of the brake drum and thereby provides an enclosed space within which the brake band 13 may be housed.

The brake band is shown as comprising a strip of sheet metal with a facing of suitable friction material, the ends of the metal strip being bent inwardly as at 13', to provide abutments for a brake operating member 14. At a point approximately intermediate the ends of the band a sheet metal loop 15 is secured to the band as by rivets 16, the loop and band together forming an eye adapted to fit loosely an anchor stud 17 preferably made integrally with the brake flange 12, the middle portion of the band being thereby supported in close proximity to the brake surface on the flange 11.

At some distance from each of the free ends of the band a pair of slots 18 are cut side by side and the metal between the slots is expanded inwardly to form an eyelet 19. A coiled spring 20 is positioned within the band with its ends connected to the eyelets 19, thereby serving to retract the band from the brake surface.

The operating member 14 is preferably shaped as a double cam and may be forged or otherwise formed in one piece with the rock shaft 21 and lever arm 22. A bearing support or sleeve for the rock shaft is provided by an apertured lug 23 on the flange 12, a bushing 24 being mounted around the rock shaft. In order to permit the assembly of the parts the aperture in the lug 23 is provided with extensions 25 of such shape and size that the cam may be inserted through the aperture, the bushing 24 having been first formed in position on the rock shaft by bending a strip of sheet metal around the shaft. The aperture in the lug 23 is so positioned that the brake operating member after insertion through the aperture must be rotated through an angle of 90° more or less in order to be brought into normal operative position. The rock shaft is therefore retained in its bearing by engagement of the end of the cam with the inner surface of flange 12.

A hole 26 is provided in the free end of lever 22 through which a brake rod 27 is inserted and adjustably retained by nut 28, the latter having lugs 29 engageable in notches 30 in the arm to retain the parts in adjusted position. A spring 31 permits adjustment and resiliently holds the nut 28 against the arm.

Various changes may be made in details of construction without departing from the scope of the invention and therefore it is not desired that the invention be limited to the specific structure set forth except as required by the language of the appended claims in view of the prior art.

I claim:

1. In brake mechanism of the class described and in combination in a rear axle housing, a brake shoe supporting flange supported from and by said axle housing; a rock shaft supported within an opening in and adjacent the periphery of said supporting flange; and a brake operating cam on one end of said rock shaft; the opening in said supporting flange being of such form and size that said cam may pass therethrough.

2. In brake mechanism of the class described and in combination with a rear axle housing, a brake shoe supporting flange supported from and by said axle housing; a rock shaft supported within an opening in and adjacent the periphery of said supporting flange; a brake operating cam upon one end of said rock shaft; and a bushing surrounding said rock shaft and fitting within said opening, and which bushing forms a bearing for said shaft; the opening in said supporting flange being of such form and size that said cam may pass therethrough.

3. In brake mechanism of the class described and in combination with a rear axle housing, a brake shoe supporting flange supported from and by said axle housing; a rock shaft supported within an opening in and adjacent the periphery of said supporting flange; and a brake operating cam upon one end of and integral with said rock shaft; the opening in said supporting flange being of such form and size that said cam may pass therethrough.

4. In brake mechanism of the class described and in combination with a rear axle housing, a brake shoe supporting flange supported from and by said axle housing; a rock shaft supported within an opening in and adjacent the periphery of said supporting flange; a brake operating cam upon one end of said rock shaft, and which cam is integral with said rock shaft; and an arm upon the other end of said rock shaft and integral therewith; the opening in said supporting flange being of such form and size that said cam may pass therethrough.

In testimony whereof I hereto affix my signature.

ROLAND V. HUTCHINSON.

Witnesses:
R. K. LEE,
A. C. LEHMAN.